United States Patent [15] 3,697,490
Starmer [45] Oct. 10, 1972

[54] POLYMERS OF ALKOXY ALKYL ACRYLATES, ALKYL ACRYLATES AND SUBSTITUTED NORBORNENE

[72] Inventor: Philip H. Starmer, Avon Lake, Ohio
[73] Assignee: The B. F. Goodrich Company, New York, N.Y.
[22] Filed: June 21, 1971
[21] Appl. No.: 155,243

[52] U.S. Cl. .........260/80.76, 260/29.6 T, 260/41 C, 260/45.7, 260/45.9, 260/45.95, 260/79.5 P, 260/86.1 R, 260/487
[51] Int. Cl............................C08f 15/16, C08f 15/18
[58] Field of Search.........................260/80.75, 80.76

[56] References Cited

UNITED STATES PATENTS

| | | |
|---|---|---|
| 3,536,681 | 10/1970 | Morris .....................260/41 R |
| 2,768,080 | 10/1956 | Hellmann et al. ......260/80.76 |
| 3,036,976 | 5/1962 | Sanderson..............260/80.76 |
| 2,985,611 | 5/1961 | Gaylord et al..........260/80.75 |
| 3,098,835 | 7/1963 | Gaylord..................260/80.75 |
| 3,249,651 | 5/1966 | Gaylord..................260/80.76 |
| 3,520,843 | 7/1970 | Moody et al............260/80.81 |

Primary Examiner—Harry Wong, Jr.
Attorney—Albert C. Doxsey et al.

[57] ABSTRACT

Acrylate elastomers having an improved retention of abrasion resistance after oil immersion, which are readily vulcanized, are prepared with 9 to 59 percent by weight alkoxy alkyl acrylate, 40 to 90 percent by weight alkyl acrylate and about 0.5 to 5.5 percent by weight substituted norbornene compounds.

7 Claims, No Drawings

POLYMERS OF ALKOXY ALKYL ACRYLATES, ALKYL ACRYLATES AND SUBSTITUTED NORBORNENE

BACKGROUND OF THE INVENTION

U.S. Pat. No. 3,536,681 shows that substituted norbornene compounds, resulting from the reaction of 2-hydroxymethyl-5-norbornene with acid halides and esters of organic acids, react with alkyl acrylates to provide cure sites for vulcanization of the polyacrylates in the soap-sulfur system. These cured polyacrylates have good flex strength, ozone resistance, and resistance to oil. They are useful for gaskets, hose, wire insulation, coatings and the like. The polymers shown in the patent have a fair balance of properties, but it would be desirable to prepare polyacrylates for cure that have an even higher level of abrasion resistance after oil immersion. Manufacturers of oil seals desire that the seals swell a maximum of 25 percent in oil at conditions ranging to as low as about −25° C.

SUMMARY OF THE INVENTION

Acrylate elastomers containing cure sites derived from substituted 2-hydroxymethyl-5-norbornene compounds are obtained by polymerizing together 9 to 59 percent by weight alkoxy alkyl acrylate, 40 to 90 percent by weight alkyl acrylate and about 0.5 to 5.5 percent by weight substituted 2-hydroxymethyl-5-norbornene.

Substituted norbornene compounds useful in this invention include reaction products of 2-hydroxymethyl-5-norbornene with acid halides or esters of alpha-chlorinated or alpha, beta-chlorinated fatty acids. The acids containing one to ten carbon atoms may be used but alpha-chlorinated derivatives of acetic, propionic, butyric and valeric acids are preferred. The acid may be reacted with an alcohol, preferably methanol, ethanol or propanol to form the corresponding ester before reacting with the 2-hydroxymethyl-5-norbornene.

The substituted norbornenes have the structure

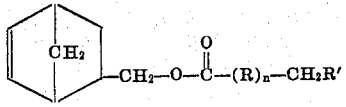

where $n$ is either zero or 1, R is

and R′ is either hydrogen or halogen, but if $n$ is zero, then R′ is halogen. These substituted norbornene compositions copolymerize with other monomers including the acrylates and provide sites for elastomer cures.

Useful alkoxyl alkyl acrylates present in the copolymers of the invention in amounts from 9 to 59 percent by weight and replacing a portion of the alkyl acrylate moiety shown in the prior art are represented by the formula

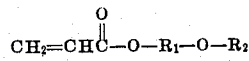

wherein $R_1$ is an alkylene radical containing one to four carbon atoms and $R_2$ is an alkyl radical containing one to four carbon atoms or an alkoxyalkyl radical. Particularly useful are alkoxy alkyl acrylates wherein $R_1$ is— $CH_2$— or —$CH_2CH_2$—, and $R_2$ is methyl, ethyl, methoxy ethyl or ethoxy ethyl. Typical alkoxy acrylates include methoxyethyl acrylate, methoxymethyl acrylate, ethoxyethyl acrylate, butoxyethyl acrylate, and methoxyethoxyethyl acrylate. An optimum retention of abrasion resistance after oil immersion has been obtained with methoxyethyl acrylate. The amount of alkoxy alkyl acrylate employed is preferably 9 to 59 percent by weight of total monomers. Lower ranges offer no aid to oil swell resistance and higher ranges detract from heat resistance.

The acrylic elastomers of this invention contain from 40 to 90 percent by weight of total monomers of acrylic acid esters having the structure

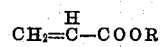

wherein R is a member of the class consisting of alkyl groups having from one to 10 carbon atoms, beta-cyanoethyl and cyanoalkyl groups having from two to eight carbon atoms. Representative lower alkyl acrylic esters are methyl acrylate, ethyl acrylate, the propyl acrylates, the butyl acrylates, the octyl acrylates, alpha-cyanoethyl acrylate, beta-cyanoethyl acrylate, and the cyanoheptyl acrylates. Most preferred in the invention are the alkyl and cyanoalkyl acrylic esters in which the alkyl group contains from one to four carbon atoms. Mixtures of alkyl acrylates are useful.

The acrylic elastomers of this invention normally have glass or second order transition temperatures of below 0° C.. In addition to having excellent abrasion resistance after oil immersion these elastomers have a good balance of oil swell resistance and low temperature flexibility plus good resistance to heat. The interpolymers are prepared by methods used by those skilled in the art in providing acrylic elastomers. Such polymerizations may be conducted in bulk or in solution, but the preferred method is to polymerize the monomers in water or in an aqueous dispersion. Polymerization may be conducted in batch reactions or the monomers may be proportioned to a reactor containing water and other desired polymerization additives. Polymerizations may be conducted at −10° to 95° C. Best results are generally obtained at temperatures in the range of 5° to 50° C in the presence of water containing a free radical generating catalyst and surface active agents.

The catalyst employed may be any of those free radical forming and other catalysts known to those skilled in the art including both organic and inorganic peroxide, inorganic persulfates, organic hydroperoxides, azo compounds, the well known redox catalyst systems, and reduced metal catalysts. Other additives to the water will include acids or bases to adjust the pH of the aqueous dispersion which usually is in the range of about 4 to 8; buffers, inorganic salts and surface active agents. Since some of the alkyl acrylates are soluble in water only minimum amounts of surface active agents are normally required to form polymers. Larger amounts normally will be employed when stable latices are desired. Such surface active agents may include anionic, cationic and non-ionic materials. Typical surface active agents found useful in preparing the interpolymers include sodium alkyl sulfates as sodium lauryl sulfates, sodium alkyl aryl sulfonates, sodium naphthalene sulfonate, quaternary salts, polyglycol fatty acid esters and the like. As is obvious, the catalysts, surface active agents, and other polymerization conditions are not critical to obtaining the improved interpolymers of this invention. If the interpolymers are prepared in the form of latices and not used as such, the elastomers are normally isolated from the latex by coagulation with salt-acid, polyvalent metal salts, alcohol and the like, and the resulting solid interpolymer washed with water and dried. The examples represent only one method for preparing the acrylic elastomers. Cements may be prepared by polymerization in a solvent or dissolving the dry polymer in a solvent.

The resulting dried elastomers may contain or have added thereto stabilizers which are effective as antioxidants and antiozonants, and in many cases improved heat resistance of the elastomers is obtained by use of such stabilizers and organic phosphites. Use of both phosphites and other antioxidants as the phenol derivatives is suggested. The usual antioxidants and stabilizers may be added to the rubber in latex state, milled or in cements. Aryl phenols are preferred as they are non-staining, but aryl amines may be used. Age resistors and antioxidants of the known type such as octylated diphenylamines, styrenated phenols, polyalkyl polyphenols, PBNA, and others, may be used.

The novel polymers of this invention may be compounded with a variety of vulcanizing agents. Examples of the vulcanization systems which can be used with these acrylic elastomers are fatty acid soaps and dipentamethylene thiuram hexasulfide, fatty acid soap and sulfur, hexamethylene diamine, triethylene diamine, ammonium benzoate, ammonium adipate, ammonium stearate, dicyandiamide with azelaic acid and the like. Also useful for special compounds are plasticizers, softeners, and tackifiers; and reinforcing pigments, for example, the various carbon blacks, both channel and furnace, inert fillers and diluents. All may be used as will be understood by those skilled in the compounding art.

DETAILED DESCRIPTION OF THE INVENTION

EXAMPLE 1.

PREPARATION OF SUBSTITUTED 2-HYDROXYMETHYL-5-NORBORNENE

A 500-ml. three-necked round bottom flask is fitted with thermometer, reflux condenser, dropping funnel and agitator. The reaction medium, 150 ml. of benzene, and 39.8 g. (0.443 mole) of 2-hydroxymethyl-5-norbornene are added and cooled at 15° C. Next 44.7 g. (0.443 mole) of triethylamine is charged, and then 50 g. (0.443 mole) of chloroacetyl chloride is added dropwise. The reaction mixture is warmed to room temperature and stands for 2 hours. It is filtered to remove solid triethylamine hydrochloride, which is washed with benzene. The benzene solution is washed consecutively with dilute hydrochloric acid, dilute sodium bicarbonate, and distilled water, then dried over anhydrous magnesium sulfate. The benzene is removed by distillation under reduced pressure. Finally the product is fractionally distilled.

The 5-chloroacetoxymethyl-2-norbornene has a boiling point of 69° – 72° C. at 0.2 mm. Analysis for chlorine is 17.6 weight percent; theoretical weight percent chlorine is 17.7 percent. The Nuclear Magnetic Resonance (NMR) spectrum is consistent with the formula set forth above where $n = 0$, and $R'$ is Cl.

EXAMPLE 2

A series of copolymers is prepared with the monomers set forth in the data table below according to a polymerization recipe using, in parts by weight, 100 of water, 2.0 alkyl phenoxypoly (ethylene oxy) ethyl ester of phosphoric acid, 0.1 sodium hydroxide, 0.01 of the sodium ferric salt ethylene-diamine tetraacetic acid, 100.0 of monomers, 0.3 of sodium salt of polymerized naphthalene sulfonic acid, 0.024 tetrasodium ethylene diamine tetraacetate, 0.3 sodium sulfate, 0.02 sodium hydrosulfite, 0.04 sodium formaldehyde sulfoxylate, and 0.04 cumene hydroperoxide. The reaction is conducted at 30° C and the monomers are proportioned into the reactor over a 2 hour period. The initial pH of the water-emulsifier mixture is between 6 and 7. Polymers are coagulated with calcium chloride solution, washed, and dried.

| Example | 2 | 3 | 4 | 5 | 6 |
|---|---|---|---|---|---|
| Ethyl acrylate | 98 | — | 49.1 | — | 48.2 |
| n-Butyl acrylate | — | 98.4 | — | 49.2 | 25.0 |
| Methoxyethyl acrylate | — | — | 49.1 | 49.2 | 25.0 |
| 5-chloroacetoxymethyl-2-norbornene | 2 | 1.6 | 1.8 | 1.6 | 1.8 |

The dry polymers are compounded to the following recipe:

| | Parts |
|---|---|
| Polymer | 100 |
| Carbon black, Fast Extrusion Furnace | 65 |
| Stearic Acid | 1 |
| Spider sulfur (sulfur dispersed with magnesium carbonate) | 0.25 |
| Potassium stearate | 1.5 |
| Sodium stearate | 1.5 |

The compounds are cured at 170° C for eight minutes and tempered 8 hours at 175° C. The vulcanizates have the following physical properties:

| Example | 2 | 3 | 4 | 5 | 6 |
|---|---|---|---|---|---|
| Modulus, 100% psi | 1110 | 250 | 1450 | 760 | 590 |
| Tensile, psi | 1550 | 890 | 1450 | 1370 | 1500 |
| Elongation, % | 190 | 270 | 100 | 160 | 250 |
| pico abrasion* tempered stock | 100 | 38 | 103 | 57 | 75 |
| after 70 hrs. at 150°C. in ASTM No. 3 oil | 46 | too swollen to test | 80 | 36 | 41 |
| % change in abrasion | −54 | failed | −22 | −37 | −45 |
| Glass temperature, raw polymer, °C. | −15 | −47 | −27.5 | −41.5 | −24 |

| Volume change in % after 70 hrs. in ASTM No. 3 oil | 17 | 147 | 10 | 30 | 29 |

Pico Abrasion is run employing the testing machine and method described in U.S. Pat. No. 2,799,155 issued July 16, 1957. It is very accurate in rating abrasion resistance of elastomers. A calibration is made using 4 standard control elastomers. The average of the 4 runs is taken as 100 and results on test stocks are reported in the table as a percent of the control.

The improved abrasion resistance after oil immersion when a portion of alkyl acrylate is replaced by alkoxyalkyl acrylate is shown by the data. An all alkyl acrylate material, except for the cure site monomer, (2, 3) loses at least half of its abrasion resistance after oil immersion. The percent change is at least −54 percent. When a portion of the alkyl acrylate is replaced by alkoxyalkyl acrylate, this percent change of abrasion resistance is improved to less than −25 percent (4), and at the same time the excellent low temperature properties of the all alkyl acrylate materials are largely retained.

When these examples are repeated with mixtures of other alkoxyalkyl acrylates and mixtures thereof, including, for example, ethoxyethyl acrylate and methoxyethyl acrylate with 1.5 to 5.0 parts 5-chloroacetoxy-2-norbornene, interpolymers with equivalent physical properties and excellent retention of abrasion resistance after oil immersion are obtained.

These improved vulcanizable acrylic elastomers are useful in applications where acrylic elastomers have been used in the past and are particularly useful in oil-carrying hose applications where maintenance of abrasion resistance after exposure to oil is highly important.

I claim:

1. A free radical catalyzed acrylate interpolymer containing polymerized together 9 to 59 percent of an alkoxy alkyl acrylate represented by the formula

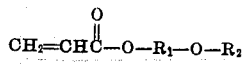

wherein $R_1$ is an alkylene radical containing one to four carbon atoms and $R_2$ is an alkyl radical containing one to four carbon atoms or methoxyethoxyethyl, 40 to 90 percent of an alkyl acrylate of the formula

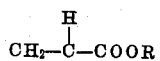

wherein R is a member of the class consisting of alkyl groups having one to 10 carbon atoms, and cyanoalkyl groups having from two to eight carbon atoms and 0.5 to 5.5 percent of an unsaturated substituted 2-hydroxymethyl-5-norbornene compound of the formula

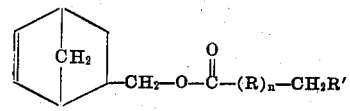

where $n$ is either 0 or 1, R is

and R' is either hydrogen or halogen, but if $n$ is zero, then R' is halogen.

2. The interpolymer of claim 1 wherein the alkoxy alkyl acrylate is methoxy ethyl acrylate.

3. The interpolymer of claim 1 wherein the alkoxy alkyl acrylate $R_1$ contains one to two carbon atoms, $R_2$ contains one to two carbon atoms, R of the alkyl acrylate contains one to four carbon atoms, and the amount of alkoxy alkyl acrylate is from 25 to about 50 percent.

4. The interpolymer of claim 1 wherein the alkoxy alkyl acrylate is ethoxyethyl acrylate and the interpolymer contains 0.5 to 5.5 percent of 5-chloroacetoxymethyl-2-norbornene.

5. The interpolymer of claim 1 wherein the cyanoalkyl is beta-cyanoethyl.

6. The interpolymer of claim 1 in a vulcanized state.

7. The interpolymer of claim 4 in a vulcanized state.

* * * * *

UNITED STATES PATENT OFFICE
CERTIFICATE OF CORRECTION

Patent No. 3,697,490            Dated October 10, 1972

Inventor(s)   Philip H. Starmer

It is certified that error appears in the above-identified patent and that said Letters Patent are hereby corrected as shown below:

Column 6, line 9, that portion of the formula reading $CH_2\text{-}\overset{H}{\underset{|}{C}}\text{-}$ should read $CH_2\text{=}\overset{H}{\underset{|}{C}}\text{-}$ . Column 6, line 22, that portion of the formula reading $\underset{Cl}{\overset{|}{C}H\text{-}}$ should read $\text{-}\underset{Cl}{\overset{|}{C}H\text{-}}$ Signed and sealed this 29th day of May 1973.

(SEAL)
Attest:

EDWARD M. FLETCHER, JR.          ROBERT GOTTSCHALK
Attesting Officer                  Commissioner of Patents